April 6, 1948.　　　　G. S. MILES　　　　2,439,094
LINEAR FOLLOW-UP SYSTEM
Filed Aug. 7, 1945　　　　2 Sheets-Sheet 1
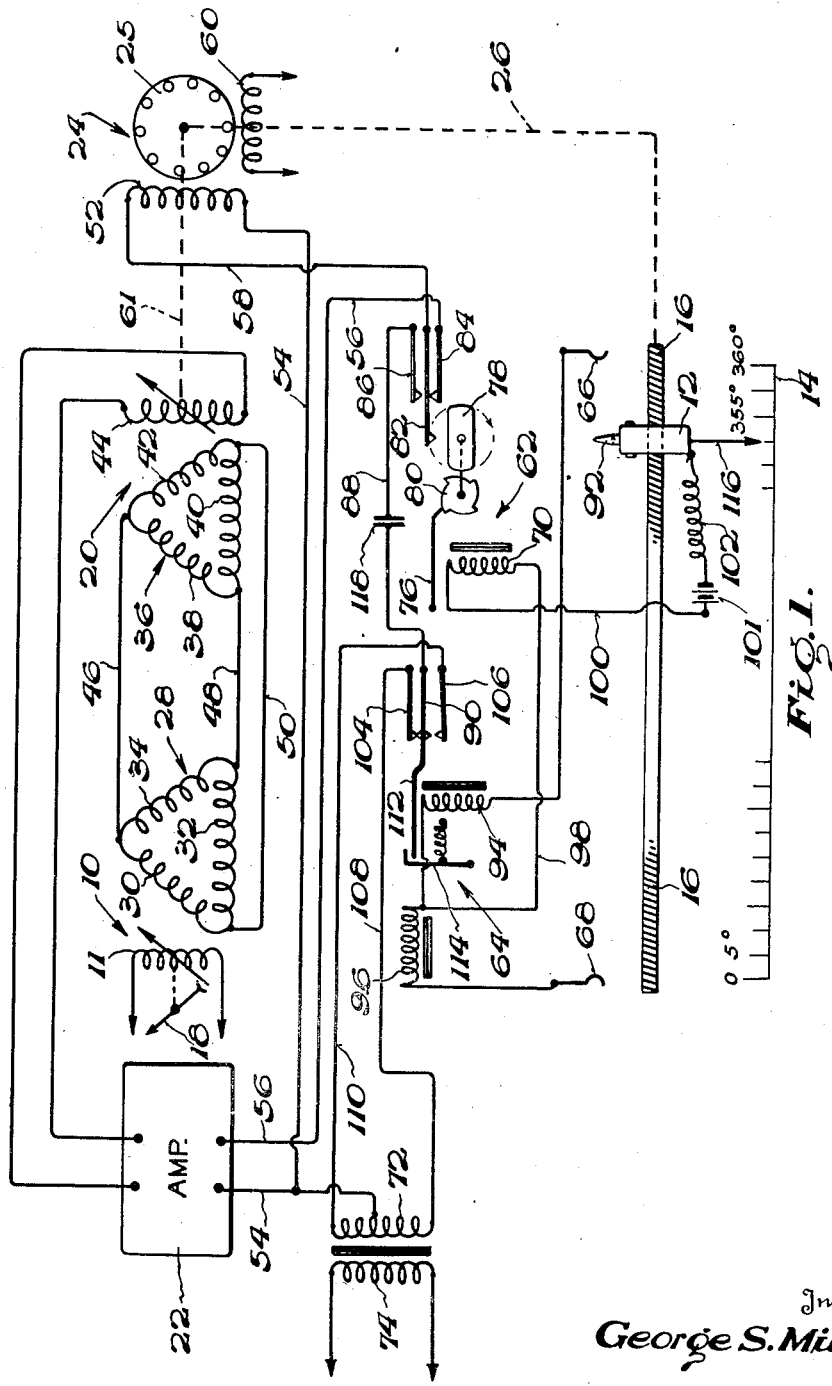
Inventor
George S. Miles.
By Anton J. Wille
Attorney

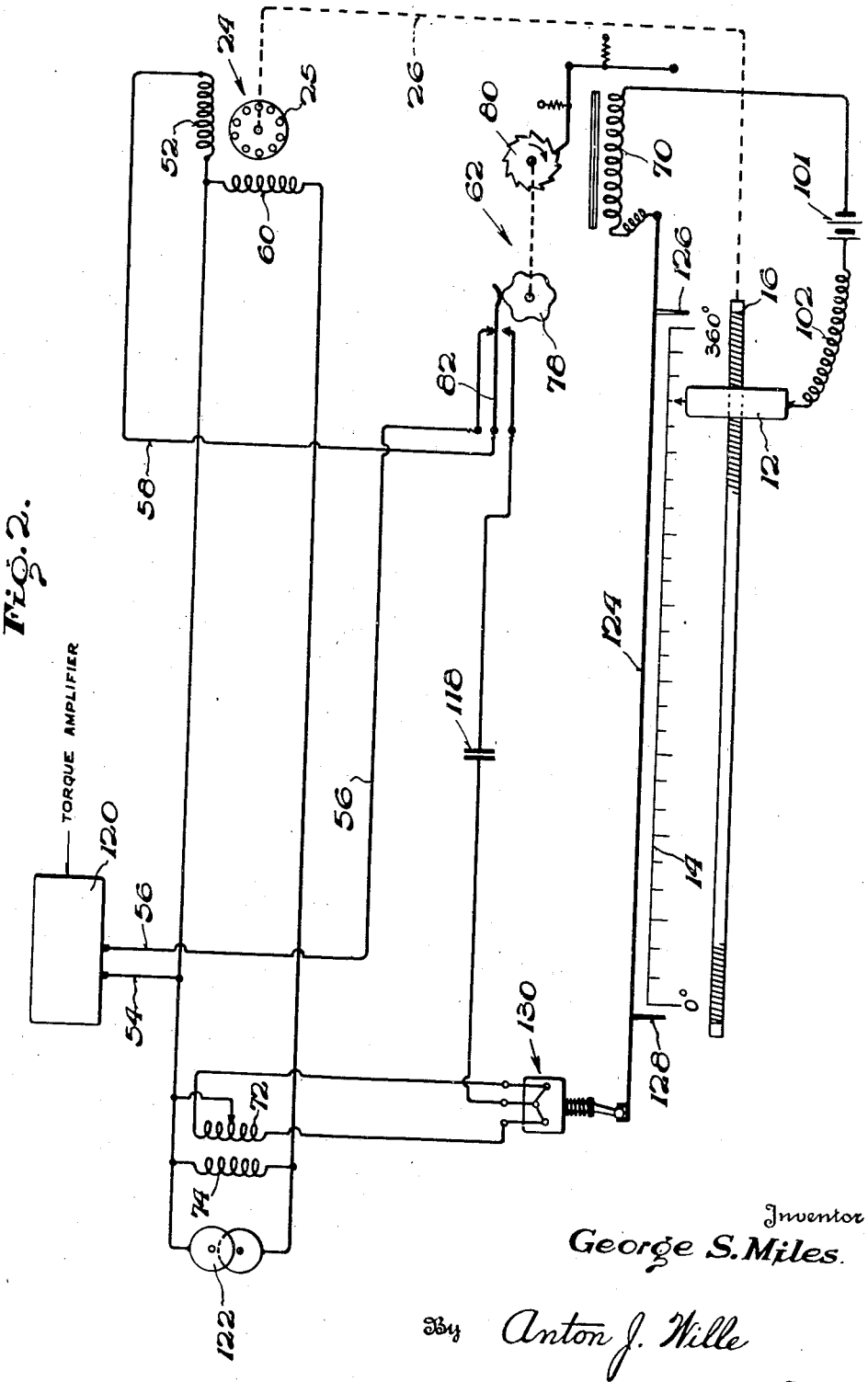

Patented Apr. 6, 1948

2,439,094

UNITED STATES PATENT OFFICE 2,439,094

LINEAR FOLLOW-UP SYSTEM

George S. Miles, New York, N. Y., assignor to Bendix Aviation Corporation, Teterboro, N. J., a corporation of Delaware Application August 7, 1945, Serial No. 609,379

6 Claims. (Cl. 177—351)

This invention relates to a linear follow-up system and more particularly to a motion transmitting system wherein rotational motion may be transformed into linear motion.

In certain types of motion transmitting mechanisms it is desirable to transmit the rotational movement of an instrument hand or pointer to a recorder needle which is linearly movable. No serious difficulty is encountered in such types of systems, as long as the rotatable instrument hand does not traverse more than one complete revolution. In such event, movement of the rotatable hand through increments from 0° to 360° may be readily transmitted to the linearly movable needle, which may be arranged to cooperate with a linear scale calibrated from 0° to 360°.

However, should the rotatable instrument hand be moved in one direction or the other, to an extent in excess of one complete revolution, a serious problem is at once presented. For example, should the rotatable hand be moved from 355° to 5° in a clockwise direction, it will be appreciated that the linearly movable pointer will be moved to 360°, which constitutes its limit of movement with respect to the linear scale, and will then tend to move further in the same direction and off of the scale. The same problem would be involved in the event that the rotatable hand passed through 0° in a reverse direction.

It is accordingly one of the objects of the present invention to provide a system for transforming rotatable motion to linear motion which is so constructed and arranged as to avoid the above difficulties and to cause proper linear indicating regardless of movement of the rotatable member through more than one revolution.

Another object of the invention is to provide a novel linear follow-up system including a rotatable transmitter and connections for causing true and accurate follow-up movement of a linearly movable recording member.

A further object resides in the provision of a rotatable transmitter and a linearly movable recorder connected together by means of a novel circuit arrangement for causing precise movement of the recorder in accordance with movement of the transmitter.

Still another object comprehends the provision of a novel construction of the above character including a torque amplifier between the transmitter and the linearly movable recorder together with circuit connections controlled by the recorder at the limits of travel thereof, the arrangement being such that movement of the latter is automatically reversed in the event that the transmitter moves a distance greater than one revolution.

A still further object includes the provision, in a system of the above character, of a novel torque amplifying and follow-up construction of relatively simple construction and which secures rapid and accurate follow-up response of the linearly movable member.

Other objects and novel features of the invention will appear more fully hereinafter from the following detailed description when taken in connection with the accompanying drawings, which illustrate two forms of the invention. It is to be expressly understood however, that the drawings are utilized for purposes of illustration only and are not designed as a definition of the limits of the invention, reference being had for this purpose to the appended claims.

In the drawings, wherein similar reference characters refer to similar parts throughout the several views:

Figure 1 is a diagrammatic view of a motion transmitting mechanism embodying the principles of the present invention, and Figure 2 is a diagrammatic view showing a slightly modified form of the invention.

Referring more particularly to Figure 1 a system illustrative of the present invention is illustrated therein as including a transmitting device 10 having a rotatable member 11, together with circuit connections for transferring movements thereof to a linearly movable recorder or rider 12, the latter being driven in opposite directions over a linear scale 14 by a rotatable lead screw 16, depending upon the direction of rotation of the latter 16, depending upon the direction of rotation of the latter. As shown, the member 10 may be connected to a rotatable hand or pointer 18 adapted to be moved over a circular scale, not shown, and, as will appear more fully hereinafter, the connections between the member 11 and the rider 12 are such that the latter will accurately indicate on the scale 14, the position of the pointer 18 with respect to its scale, regardless of whether or not the said pointer has traversed more than one complete revolution.

In order to transmit the motion of the pointer 18 to the rider 12, in the manner referred to above, it is preferable to employ a system for amplifying the torque resulting from the pointer movement. As shown, such a system includes a self-synchronous telemetric arrangement comprising the transmitter 10, a receiver 20, an amplifier 22 and a two-phase induction motor 24, the latter having a rotor 25 which is connected through a connection 26 with the lead screw 16 for operating the latter in opposite directions. More particularly, the transmitter 10 includes the rotatable winding 11 which is inductively associated with a stator 28, the latter comprising windings 30, 32 and 34 connected in three-phase relation. Receiver 20 likewise includes a stator 36 comprising windings 38, 40 and 42 arranged in three phase relation together with an inductively related rotor winding 44, leads 46, 48 and 50 connecting the stators 28 and 36 and the arrangement being such that these parts may be positioned remotely from each other. The output of winding 44 is amplified by the amplifier 22 and utilized in a manner to be more particularly described hereinafter, to energize one of the field windings 52 of the two-phase induction motor 24 through connections 54, 56 and 58, the other field winding 60 being energized from a suitable external source of alternating current supply. In addition to the connection 26, the rotor 25 is also connected with the rotor winding 44 through a connection 61 in order to secure the desired follow-up action during operation of this part of the system.

In operation of the torque amplifying follow-up mechanism, it will be understood that with the rotor winding 11, energized from the external source of alternating current supply, any variation in the inductive relationship between the rotor 11 and the stator 28, due to movement of the said rotor and connected pointer 18, will cause a resultant voltage to be induced in the receiving rotor winding 44 through the connected stator windings 28 and 36, the magnitude and phase relation of such resultant voltage being determined by the spatial position of the winding 11. Such resultant voltage, after being amplified by the amplifier 22 and applied to the winding 52 of the induction motor 24, causes rotation of the rotor 25 and through the connection 61, the winding 44 will be rotated until the position in space of the latter corresponds precisely to the position in space of the winding 11 and pointer 18. When this equality in positional relationship occurs, the system is in a null condition where no voltage is induced in the winding 44. The winding 52 of the motor 24 is hence de-energized and the motor 24 comes to rest.

It will be observed from the foregoing that operation of the motor 24 is determined solely by movement of the rotatable winding 11 and pointer 18 driven thereby, and that as soon as the motor has moved to an extent proportional to the new position of the winding 11 and pointer 18, it comes to rest. Hence, it will be readily perceived that under the conditions described, the motor 24 will operate the lead screw 16 through connection 26 so that the rider 12 may follow-up any change of position of the pointer 18. It will be understood that any suitable motion reduction mechanism may be incorporated in the connections 26 and 61 in order to secure the results above set forth.

With the system thus far described, it will be apparent that in the event that the pointer 18 and the rider 12 both indicate 355° on their respective scales, and the pointer 18 moves clockwise to 5°, for example, the motor 24 would tend to rotate the lead screw 16 to carry the rider 12 beyond the 360° limit of the linear scale 14. One of the important features of the present invention resides in coordinating the movement of the rider 12 with that of the pointer 18 so that follow-up linear movement of the rider will occur regardless of one or more complete revolutions of the rotatable pointer.

In order to accomplish the foregoing highly desirable result, the present invention provides a novel arrangement for reversing the operation of the motor 24 whenever the rider 12 reaches either extreme position with respect to the scale 14. As shown in Figure 1, such means include a stepping relay 62, a latch relay 64, and circuit connections including said relays and contacts 66 and 68 for returning the rider 12 to either end of its path of movement, when the pointer 18 passes the 360° position, depending upon the direction of rotation thereof. Such means are moreover so constituted that when the rider 12 is moved to the proper end of the scale 14, the motor 24 is reconnected to the system so that the rider may be moved to a position corresponding to the new position of the rotatable pointer 18.

More particularly, the stepping relay includes a core winding 70, which when energized, functions to disconnect the lead 58 of the field winding 52 from the amplifier connection 56, and connect the said lead 58 to one end or the other of a transformer secondary winding 72, which in turn is associated through a primary winding 74 with the alternating current supply. Such change in connections is secured by downward movement of an armature 76 which rotates a cam 78 a quarter of a revolution through operation of a stepping cam 80. In the position shown, leads 56 and 58 are connected through a movable contact 82 which normally engages a stationary contact 84. However, when the cam 80 is operated as above described, the movable contact 82 is moved into engagement with a fixed contact 86 which connects the lead 58 to a lead 88, which latter lead is connected with a movable contact 90 of the latch relay 64. Thus, when contacts 66 or 68 are engaged by contact 92 carried by the rider, the field winding 52 of the motor 24 is alternately connected to the external power source 72 or connected to the amplifier 22. The function of the latch relay 64 is to select the proper end of the transformer secondary 72 to which the winding 52 is connected, in order to rotate the motor 24 in the proper direction to obtain the desired result.

Latch relay 64 more particularly includes a latch core winding 94 which is arranged in series with an unlatch core winding 96 and the contacts 66 and 68. Intermediate these windings, a lead 98 is connected to one end of the winding 70, the other end of the latter being connected to a battery 101, or other local source of energy through a lead 100. Contact 92 carried by the rider 12 is connected to the other terminal of the battery through a flexible lead 102.

In order to reverse the connection between the lead 88 and opposite ends of the transformer secondary 72, the movable contact 90 may engage either of the stationary contacts 104 or 106, the latter being respectively connected with the secondary winding 72 as by means of leads 108 and 110. Normally the movable contact 90 engages the contact 104 and thus the leads 88 and 110 are connected. However, when the latch winding 94 is energized, the movable contact 90 is moved to engage the stationary contact 106 through downward movement of an armature 112 connected to the contact 90. Such engagement between the contacts 90 and 106 is maintained, notwithstanding de-energization of the winding 94, through a latching armature 114. Subsequent energization of the unlatch winding 98, however, will attract the latching armature 114 and the armature 112 and contact 90 being thus released, will return to the normal position shown.

In the operation of the system and with the mid-point of the transformer secondary 72 connected by a lead 116 with the connection 54, let it be assumed that the pointer 18 is rotated clockwise from the position shown to the 5° position. Through the action of the telemetric system and torque amplifier including the motor 24, the rider 12 will be moved to the right through rotation of the lead screw 16. When indicator 116 secured to the rider reaches 360° as shown on the linear scale 14, contacts 92 and 66 will engage, whereupon energization of the stepping relay 62 serves to disconnect the field winding 52 from the amplifier 22 and connect the same to the movable contact 90 of the latch relay 64. Simultaneously with the above action, energization of the latch winding 94 moves the contact 90 into engagement with the contact 106, thus connecting the field winding 52 to the upper end of the transformer secondary 72 by way of leads 110, 88 and 58, it being observed that lead 88 includes a phasing condenser 118 for securing the proper phase relationship on the field winding 52 under these conditions. The aforesaid connections are such that the motor 24 reverses its direction of rotation and returns the rider 12 to the 0° position where the contacts 92 and 68 are engaged. This causes energization of the stepping relay winding 70 to effect re-engagement between contacts 82 and 84 which reconnects the field winding 52 with the amplifier. The motor 24 thereupon reverses its direction of rotation and operates in accordance with the magnitude and phase relationship of the voltage which is proportional to the spatial position of the pointer 18 and winding 11, and motion thereof is arrested as soon as the position of the winding 44 is in agreement with that of the winding 11. When this condition occurs, the indicator 116 will register 5° on the linear scale 14.

It will be understood that when contacts 92 and 68 engage, the unlatching coil 96 is also energized. This action serves to move the armature 114 to the position shown in Figure 1 to allow re-engagement of contacts 90 and 104 in order to connect the lead 88 with the lower end of the transformer secondary 72 by lead 108. With the establishment of such a connection, it will be understood that the circuit to the field winding 52 is conditioned in such a manner that the motor 24 would move the rider 12 to the right, in the event that the pointer 18 were moved counter-clockwise from 5° to 355°, for example. This will be clear when it is borne in mind that motor 24 will initially move the rider 12 to the left in response to the action of the self-synchronous system. As soon as contacts 92 and 68 are engaged, however, energization of winding 10 of the stepping relay will connect lead 58 to lead 88 and thus the motor 24 will be connected to the external source of current supply and reversal of its direction of rotation, will return the rider to the right-hand position whereupon contacts 92 and 66 will engage. At that time, operation of the stepping relay 62 will reconnect the field winding 52 to the amplifier and the rider 12 will be returned to the 355° position in the manner heretofore described.

The modification illustrated in Figure 2 is similar to that shown in Figure 1, except that a slightly different structure is employed for selecting the end of the transformer secondary winding 72, to which the variable field winding 52 may be connected for determining the direction of rotation of the motor 24. In Figure 2, the rotatable transmitter 11, self-synchronous parts 10 and 20, and the amplifier 22 of Figure 1, are shown as the torque amplifier 120, while an external source of alternating current 122 is shown as adapted to energize the transformer primary 74 and the fixed field winding 60.

In order to control the motor 24 in accordance with the movements of the rider 12, a reversing bar 124 is arranged to be moved linearly of itself when the rider engages the contact members 126 or 128 depending upon which end limit, the rider has attained. The step relay winding 70 is electrically connected with the bar 124 and the construction is such that the said winding is energized whenever the rider 12 contacts the members 126 or 128. As soon as such contact is effected, it will be readily understood that the bar 124 slides a slight amount in order to operate a reversing toggle switch 130 which provides the correct connections for proper operation of the motor 24 when the latter is disconnected from the torque amplifier and connected with the external source. Switch 130 therefore functions similarly to the latch relay 64 of Figure 1. Since the operation of the construction of Figure 2 is exactly similarly to that of Figure 1, except in the respects above noted, further discussion thereof is not believed to be necessary.

There has thus been provided by the present invention a novel motion translating system wherein true and accurate follow-up movement of a linearly movable indicator pen or recorder is effected under the control of a rotatable indicator hand or pointer and regardless of whether or not the latter traverses more than one complete revolution. The use of the self-synchronous system provides the advantage that the two indicators may be remotely positioned with respect to each other without sacrificing accuracy and speed of operation. It will be moreover appreciated that the arrangement provides relatively few parts which are comparatively simple in construction and operation, and the entire apparatus is such that it may be readily incorporated in existing systems where a linearly movable indicator or recorder is desired to follow the movements of a rotatable transmitter through more than one revolution of the latter.

While two embodiments of the invention have been illustrated and described herein, it will be understood that the invention is not limited thereto, but may receive a variety of expressions. For example, the indicating scale 14 may be a traveling recording tape if desired. Moreover, while the torque amplifier has been shown as comprising a particular type, other forms may be used wherein a follow-up power device is adapted to cause movement of the rider in accordance with variations in position of a rotatable transmitter. Various other modifications may be resorted to, as will now appear to those skilled in the art without departing from the spirit of the invention as defined in the appended claims.

What is claimed is:

1. A linear follow-up system comprising a rotatable element movable through one or more revolutions, means for deriving a signal proportional to the spatial position of said element, means for amplifying said signal, an indicating member constrained for linear movement, a linear scale for said member, a two-phase induction motor having a field winding normally energized by said amplified signal, means connecting said motor and linearly movable member to position the latter in accordance with the spatial position of said rotatable element, and circuit connections for said motor controlled by the linearly movable member as it reaches the end of said scale for controlling said field winding to reverse the operation of said motor to cause said member to move in an opposite direction the full length of said scale where the motion is again reversed to permit said member to be moved into spatial agreement with said rotatable element.

2. A linear follow-up system comprising a rotatable element movable through one or more revolutions, means for deriving a signal proportional to the spatial position of said element, means for amplifying said signal, an indicating member, a linear scale for said member, said scale being calibrated in accordance with one complete revolution of said element, a two-phase induction motor having a field winding normally energized by said amplified signal, means connecting said motor and member to drive the latter linearly over said linear scale and position the member in accordance with the spatial position of said rotatable element, a pair of relays each adapted to be energized respectively when said movable member reaches the respective ends of said scale, and circuit connections including said relays and said field winding to reverse the operation of said motor when either of said relays is energized to cause follow-up movement of said member in accordance with the position of said element, regardless of one or more complete revolutions of the latter.

3. A linear follow-up system comprising a rotatable element movable through one or more revolutions, means for deriving a signal proportional to the spatial position of said element, means for amplifying said signal, an indicating member, a linear scale for said member, said scale being calibrated in accordance with one complete revolution of said element, a two-phase induction motor having a field winding normally energized by said amplified signal, means connecting said motor and member to drive the latter linearly over said linear scale, and means connected into the field circuit of said induction motor to control the energization of said winding to vary the direction of rotation of said motor to position the member in accordance with the spatial position of the element, regardless of one or more complete revolutions of the latter, comprising a stepping relay adapted to be energized when said indicating member reaches the end of said scale, and a reversing switch mechanism adapted to be actuated by said member when it reaches either end of said scale.

4. A linear follow-up system comprising an electromagnetic transmitter having a rotatable element movable through one or more complete revolutions, a follow-up motor, means connecting said transmitter and motor to move the latter to a position corresponding to the spatial position of said element, an indicating member, a linear scale for said member, said scale being calibrated in accordance with one complete revolution of said element, means connecting the motor and member to drive the latter linearly over said linear scale, and means connected into the motor circuit controlled by movement of said member to either end of the linear scale when the element completes one revolution in either direction to reverse the operation of the motor to drive the member to the opposite end of the scale where said motor is again reversed to drive said member in agreement with said rotatable element.

5. A linear follow-up system as set forth in claim 4 in which the means controlled by movement of the member includes a stepping relay adapted to be energized when said indicating member reaches either end of said scale and a latch relay adapted to be energized when said indicating member is moved to the beginning of said scale.

6. A linear follow-up system as defined in claim 4 wherein the means controlled by movement of the member includes a stepping relay adapted to be energized when said member reaches the end of said scale and a reversing switch adapted to be actuated when said member reaches either end of said scale.

GEORGE S. MILES.

REFERENCES CITED

The following references are of record in the file of this patent:

UNITED STATES PATENTS

| Number | Name | Date |
| --- | --- | --- |
| 1,669,112 | Winter | May 8, 1928 |
| 1,835,907 | Shiland | Dec. 8, 1931 |
| 1,982,350 | Mittag | Nov. 27, 1934 |
| 1,998,939 | Mittag | Apr. 23, 1935 |